United States Patent [19]

Culleiton et al.

[11] 4,284,607
[45] Aug. 18, 1981

[54] CHLORINATION OF ALUMINOUS MATERIALS USING PRESELECTED SOLID REDUCING AGENTS

[75] Inventors: Charles J. Culleiton, Tarentum; Subodh K. Das, Apollo, both of Pa.; Ronald C. Schoener, Colville, Wash.

[73] Assignee: Aluminum Company of America, Pittsburgh, Pa.

[21] Appl. No.: 73,925

[22] Filed: Sep. 10, 1979

[51] Int. Cl.³ .............................................. C01F 7/60
[52] U.S. Cl. ....................................... 423/137; 423/496
[58] Field of Search ............... 423/136, 137, 495, 496, 423/461

[56] References Cited

U.S. PATENT DOCUMENTS

| | | | |
|---|---|---|---|
| 1,268,015 | 5/1918 | King | 423/130 |
| 1,366,626 | 1/1921 | Alexander | 423/136 |
| 1,509,605 | 9/1924 | McKee | 423/136 |
| 1,544,328 | 6/1925 | McAfee | 423/135 |
| 2,084,290 | 6/1937 | McAfee | 423/136 |
| 3,760,066 | 9/1973 | Calcagno | 423/496 |
| 3,929,975 | 12/1975 | King | 423/137 |
| 3,956,454 | 5/1976 | Nemecz | 423/137 |
| 4,083,927 | 4/1978 | Wyndham | 423/137 |
| 4,100,265 | 7/1978 | Yoshimura | 423/460 |
| 4,105,752 | 8/1978 | Becker | 423/496 |
| 4,139,602 | 2/1979 | Wyndham | 423/137 |

FOREIGN PATENT DOCUMENTS 1141359  1/1969  United Kingdom ..................... 423/137

OTHER PUBLICATIONS

Rose, K. E. "Delayed Coking-What You Should Know" *Hydrocarbon Processing*, Jul. 1971, pp. 85–92.
Foulkes, P. et al., "Prospects for Coking May Brighten" *Oil and Gas Journal*, Mar. 20, 1978, pp. 85–93.
Bennett, H. (Ed.) *Concise Chemical and Technical Dictionary*, 3rd Ed., Chem. Pub. Co., N.Y. (1974) p. 206.
Mantell, C. *Carbon and Graphite Handbook*, Interscience, pp. 143–160.
McAfee, A. in *Industrial and Engineering Chemistry* vol. 21, No. 7, (1929) pp. 670–673.
Kirk-Othmer, *Encyclopedia of Chemical Technology* 2nd Ed., vol. 4, pp. 166, 169–171, Interscience, N.Y. (1964).

*Primary Examiner*—Brian E. Hearn
*Attorney, Agent, or Firm*—David J. Hill

[57] ABSTRACT

Chlorination of aluminous materials such as alumina and bauxite is carried out at 575° to 750° C. in the presence of a solid reducing agent. The reducing agent is a green coke which has been calcined at a temperature between 650° C. and 900° C. for a period of from 10 to 120 minutes.

11 Claims, 5 Drawing Figures

COKER

CHLORINATION OF ALUMINOUS MATERIALS USING PRESELECTED SOLID REDUCING AGENTS

BACKGROUND OF THE INVENTION

This invention relates to the chlorination of aluminous material to form aluminum chloride and more particularly to the chlorination of aluminous material in the presence of a particular solid reducing agent.

It is known to chlorinate aluminous material in the presence of solid reducing agents. One aspect of such a reaction which significantly influences the completeness of the reaction is the manner of bringing about contact of the reactants. Techniques which have been used to bring the aluminous material and the reducing agent into sufficiently intimate contact to promote chlorination include mixing a specially treated carbon source with the aluminous material, briquetting a carbon-alumina mixture or coating the aluminous material with a liquid hydrocarbon.

McAfee (U.S. Pat. No. 2,084,290) describes as the "oldest method for the manufacture of aluminum chloride", subjecting a mixture of hot carbon and alumina in a heated retort to the action of chlorine. It is this basic process which must be modified and improved to make the production of aluminum chloride more efficient and economic. In this vein, use of even cheaper or less pure reactant materials is being evaluated and explored. Becker et al (U.S. Pat. No. 4,105,752), for example, disclose a method for chlorinating aluminous material in which activated carbon derived from coal is used. In their procedure, Becker et al prepare activated carbon by contacting coal with an acidic leaching solution, removing the greater portion of the leaching solution and calcining this treated coal at 550°-775° C. While this procedure does successfully utilize a cheaper starting material, it also requires a significant amount of pretreatment of the carbon source before mixing with the aluminous material.

It would be particularly advantageous to have a carbon reductant suitable for use in a chlorination reaction, which reductant is readily available and requires minimal pretreatment.

SUMMARY OF THE INVENTION

It is an object of this invention to provide a highly economical process for the production of aluminum chloride.

It is a further object of this invention to utilize green petroleum coke as a source of carbonaceous material in the production of aluminum chloride.

In accordance with these objectives the present invention provides a process for the production of aluminum chloride. The process includes exposing an aluminous material to a chlorine source in the presence of a solid reducing agent, hereinafter defined, at a temperature of 575° to 750° C. Aluminum chloride, produced in vapor form, is removed and subsequently condensed.

DETAILED DESCRIPTION OF THE PREFERRED EMBODIMENTS

Figure 1:
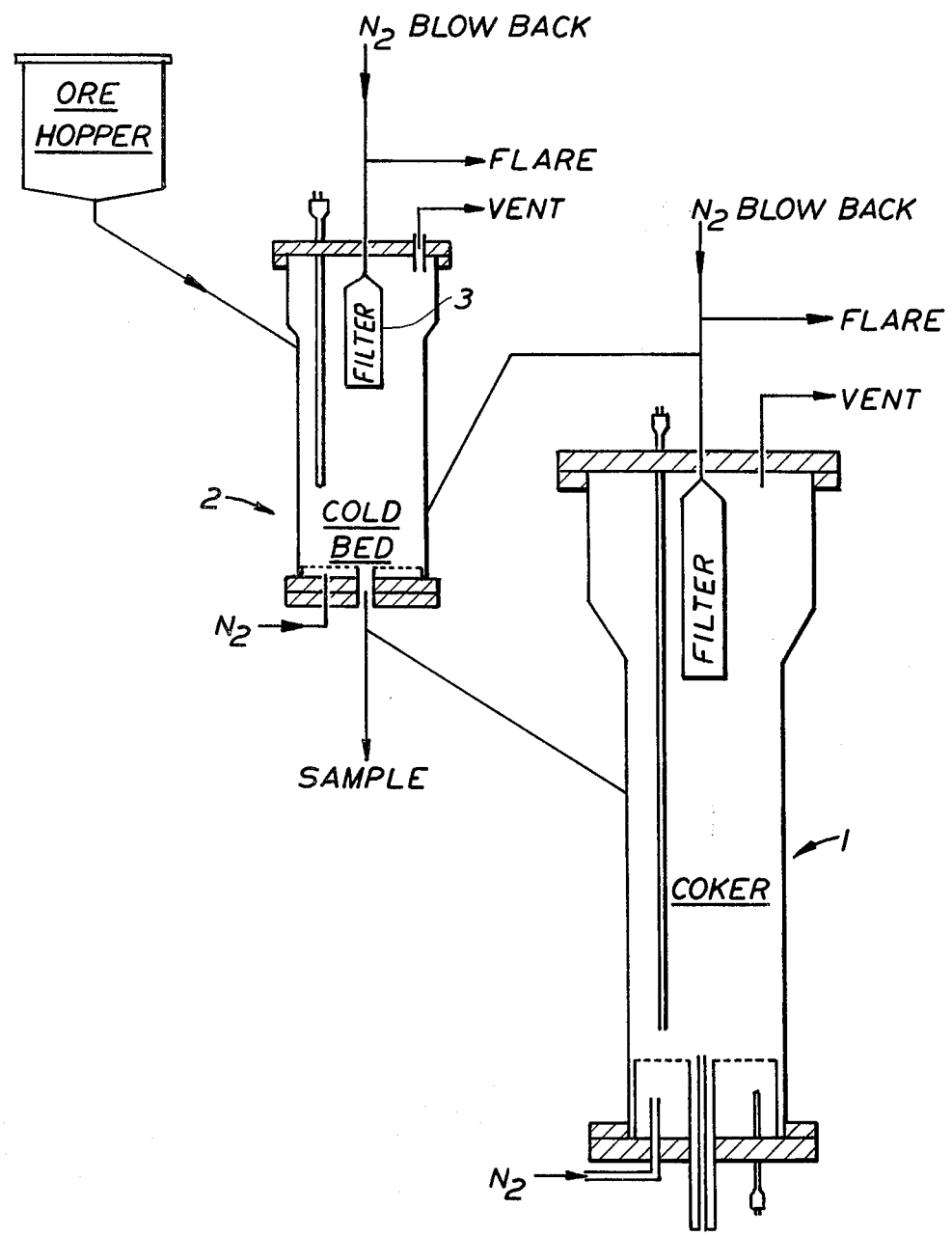
FIG. 1 is a sketch of a coker suitable for use in the present invention.

In accordance with the present invention, aluminous material is chlorinated in the presence of a solid reducing agent made from green coke. Suitable green coke may be the product of delayed coking or of fluid coking, but green petroleum coke made by the delayed coking process is preferred. The green petroleum coke is calcined at a temperature between 650° and 900° C. for a period of 10 to 120 minutes. It is the calcined coke which is used in the chlorination step.

The term "delayed coking" refers to a particular process of coking well known to those skilled in the art in which formation of coke is delayed until it reaches a coke drum. The process of delayed coking is described in more detail by P. B. Foulkes and M. D. Harper in an article entitled "Prospects for Coking May Brighten", on pages 85–93 of the Mar. 20, 1978 edition of the *Oil and Gas Journal*, and in an article by K. E. Rose entitled "Delayed Coking—What You Should Know", on pages 85–92 of the July 1971 edition of *Hydrocarbon Processing*. These articles are hereby incorporated by reference.

Before the green coke can be used as a reducing agent in the chlorination reaction, it must be calcined to remove moisture and volatiles. In the above-mentioned Foulkes and Harper article, calcination temperatures of 1200°–1350° C. are suggested to refine the crystalline structure of the coke. However, in accordance with the present invention, it has been found that the use of coke which has been subjected to much lower calcination temperatures and shortened calcination times quite unexpectedly increases the rate at which the aluminous material may be chlorinated.

In accordance with the invention, the green coke is subjected to a calcination temperature of at least 650° C., but less than 900° C., preferably at 825° C., for a period of from 10 to 120 minutes with 30 minutes being the preferred time.

Aluminous material which may be chlorinated in the presence of the reducing agent pursuant to the present invention includes alumina, bauxite, clay and other alumina-bearing materials. Alumina is the preferred material for production of aluminum chloride suitable for making aluminum metal.

With respect to the alumina or aluminum oxide, it is preferred that most of the impurities be removed therefrom prior to chlorination. Thus a highly preferred source of aluminum oxide for use in the present invention is alumina, i.e. the aluminum oxide product obtained after the same has been extracted from its ores. The well known Bayer process is one source of such alumina, in which process, bauxite ore is extracted with caustic soda to selectively dissolve the aluminum content as sodium aluminate while leaving behind impurities such as iron, silicon and titanium. In this process, alumina is recovered as Bayer hydrate, i.e. $Al(OH)_3$, which is subsequently calcined to remove most of the water for reasons which will be discussed below.

It is preferred that the alumina used in the present invention have a low hydrogen and water content. Hydrogen or hydrogen-bearing compounds react to form hydrogen chloride and can result in the loss of valuable chlorine. Thus, alumina suitable for use in this process is preferably made from hydrate calcined to substantially remove hydrogen or hydrogen-bearing compounds such as water. Such calcining can be carried out in kilns or furnaces at a temperature of 600° to 1200° C. or higher. It is preferred to carry out such calcining such that gamma-type alumina predominates, since this type alumina is preferred because of its higher reactivity. In a preferred embodiment of the invention, alumina should have a surface area of 70 to 120 m$^2$/g.

A preferred source of chlorine suitable for use in the present invention is $Cl_2$. However, other chlorine bearing materials such as $COCl_2$ and $CCl_4$ or mixtures thereof can be used. Preferably, the chlorine used is in the gaseous form.

The amount of coke used is from a minimum of 10 wt.% up to 30 wt.% of the mix with alumina, with 15 to 25 wt.% being preferred. While there is no theoretical maximum amount of coke which may be used, practical considerations (such as economics) will determine a limit.

In accordance with the invention, the aluminous material may be chlorinated in the presence of a catalyst which is an alkali metal compound. Preferred are alkali aluminum halides Alkali aluminum halides which can be included are potassium aluminum chloride, sodium aluminum chloride, rubidium aluminum chloride and lithium aluminum chloride. The catalysts may be formed in situ by the initial addition of an alkali metal halide to the chlorination such as, for example, sodium chloride, sodium bromide, potassium iodide or the like. In this regard, it should be noted that the alkali metal compound initially added to the reaction is converted to an alkali metal aluminum chloride complex having the formula $MAlCl_4$ or $MCl.AlCl_3$. Therefore, the alkali metal compound could be initially added as an oxide or salt other than a halide such as, for example, $K_2CO_3$, $KNO_3$ or the like.

In the most preferred embodiment of this invention, green petroleum coke is mixed with alumina. The mixture is then loaded into the feeder of a coker such as that illustrated in FIG. 1. When the coker has been heated to the desired temperature, the green petroleum coke-alumina mixture is fed into the coker where it is roasted at a temperature between 650° and 900° C., preferably 825° C., for a brief period of time. After roasting, the mixture is drained from the bottom of the coker and fed into a reactor (such as that shown in FIG. 2) where the mixture is chlorinated at a temperature between 575° and 750° C. Although the reactor described herein is a fluidized bed reactor, other types of reactors (e.g. a packed bed) could also be used.

The coker of FIG. 1 is an all metal system, consisting of a stainless steel coker 1, a steel water cooled bed 2, transfer lines and a flare system. Vapors and nitrogen fluidization gas are removed from the coker through a filter 3.

Figure 2:
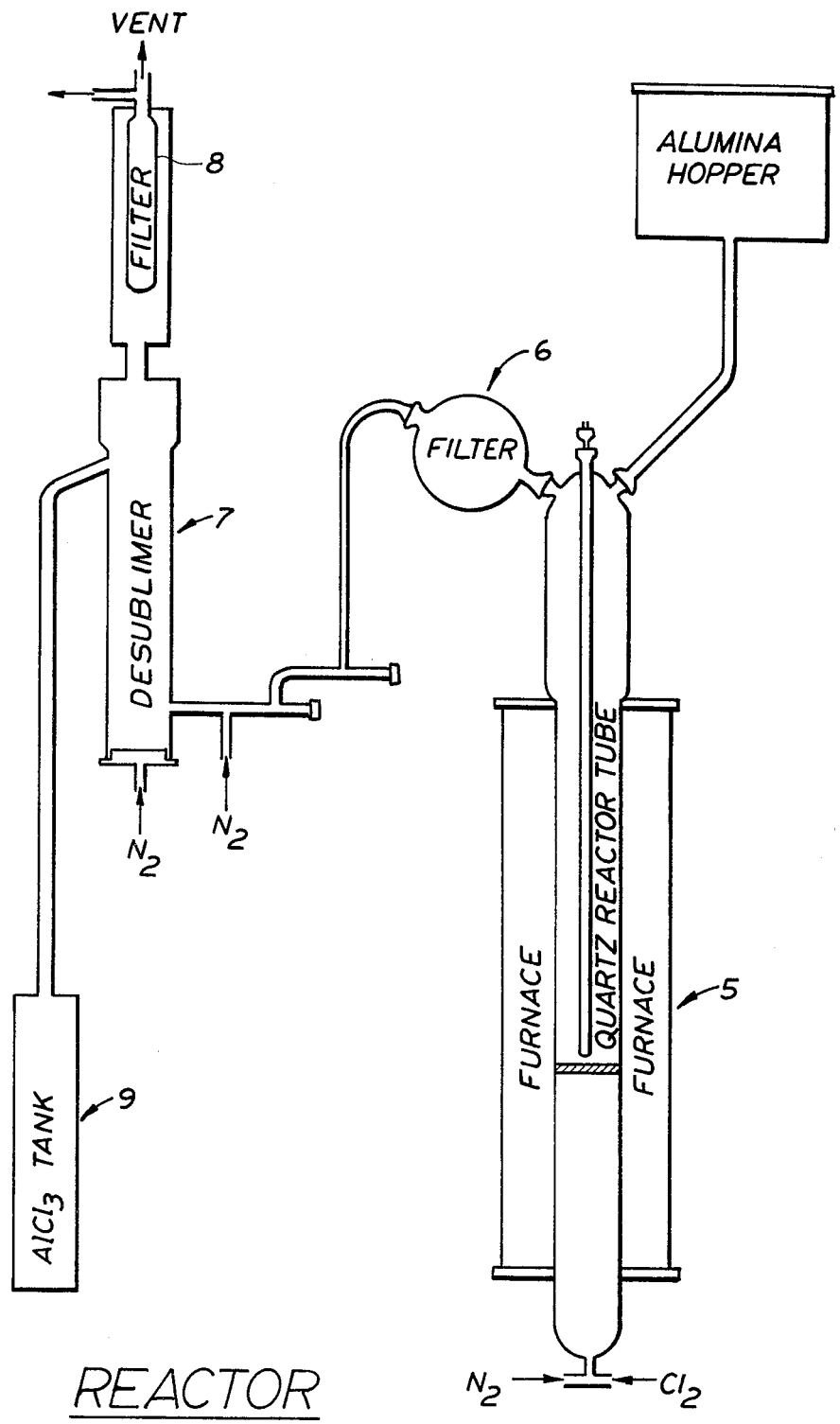
FIG. 2 is a sketch of a chlorine reactor suitable for use in the present invention.

The reactor in FIG. 2 consists of a quartz reactor tube positioned in a large vertical tube furnace 5, a Pyrex filter 6, a desublimer 7, with filter 8, and an aluminum chloride storage tank 9. During normal operation, chlorine is fed into the bottom of the reactor containing coked aluminous material or a separate carbon reductant plus aluminous material at a temperature of 575° to 750° C. The aluminum chloride vapors that exit through the filter 6 are condensed in the water cooled desublimer 7 at 60° C. The excess solid aluminum chloride flows from the condenser into the aluminum chloride storage tank.

Figure 4:
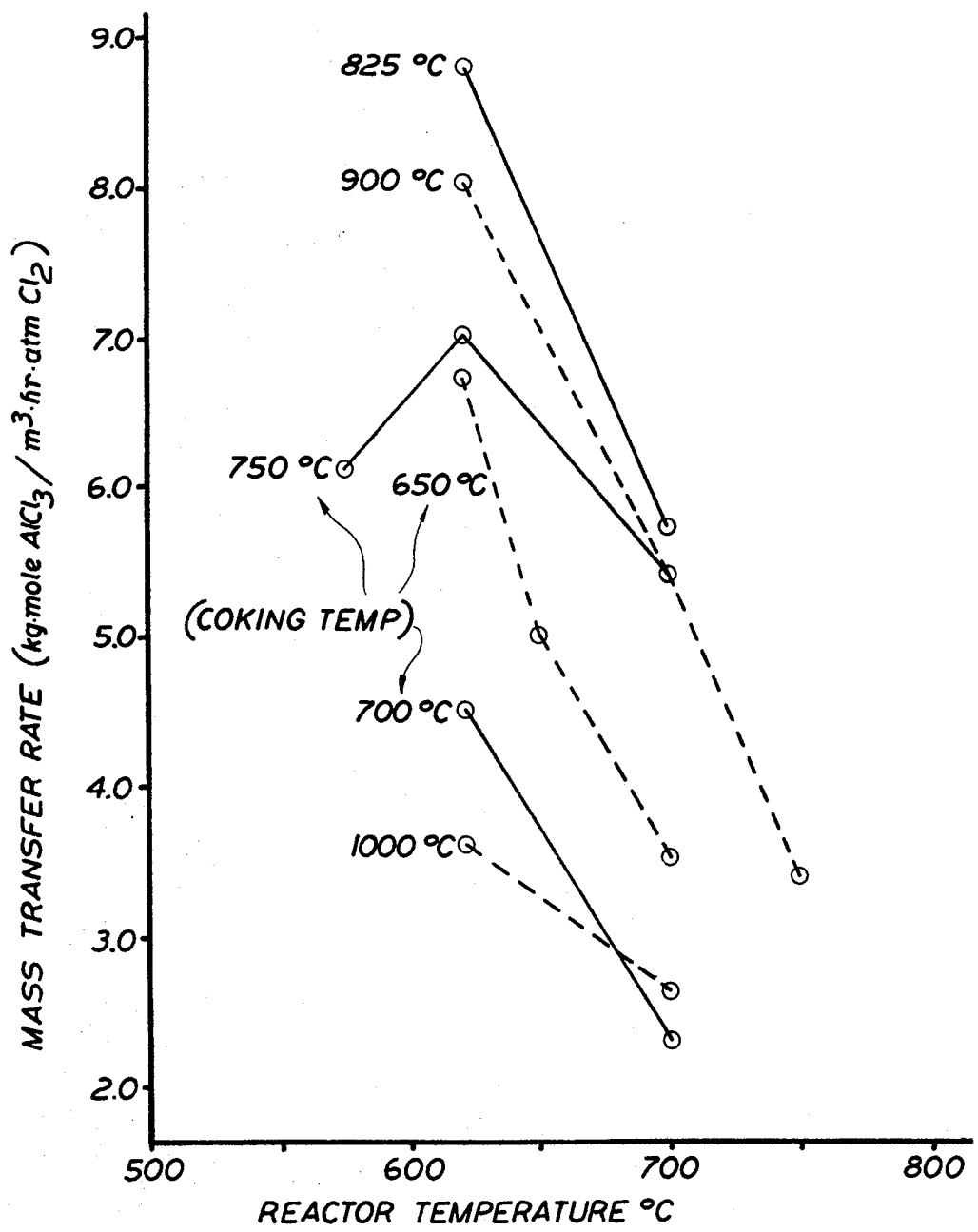
FIG. 4 is a graph showing the effect of reactor temperature upon mass transfer rate.

In this most preferred method of carrying out the present invention, alumina and green petroleum coke are mixed. This mixture is then calcined, i.e. subjected to a temperature of 650° to 900° C. for a period of from 10 to 120 minutes. The calcination is desirably carried out at 825° C. for 30 minutes. Chlorine gas is then introduced to the mixture. Preferably, the gas is introduced at a rate sufficient to fluidize the mixture and to provide maximum flow of gas without producing substantial entrainment of the particles of the mixture in the gas. Thus, the chlorination reaction is carried out such that chlorine and carbon react with the alumina to produce a gaseous reaction mixture of effluent and carbon oxides which emanate from the reaction chamber. Preferably, the temperature and carbon content should be such that the gaseous effluent contains aluminum chloride and a substantial amount of carbon dioxide. That is, it is preferred that the formation of carbon monoxide and phosgene be kept to a minimum. Thus, the reaction temperature should be maintained in the range of 575° to 750° C. and preferably in the range of 600° to 650° C. with a typical reaction temperature being about 625° C. The effect of reactor temperature is graphically illustrated in FIG. 4.

It should be noted that it is important to control the reaction temperature within the above temperature ranges. For example, if the reaction temperature is permitted to exceed the higher temperature, deactivation of the calcined petroleum coke can occur, seriously interfering with the aluminum chloride production.

Figure 5:
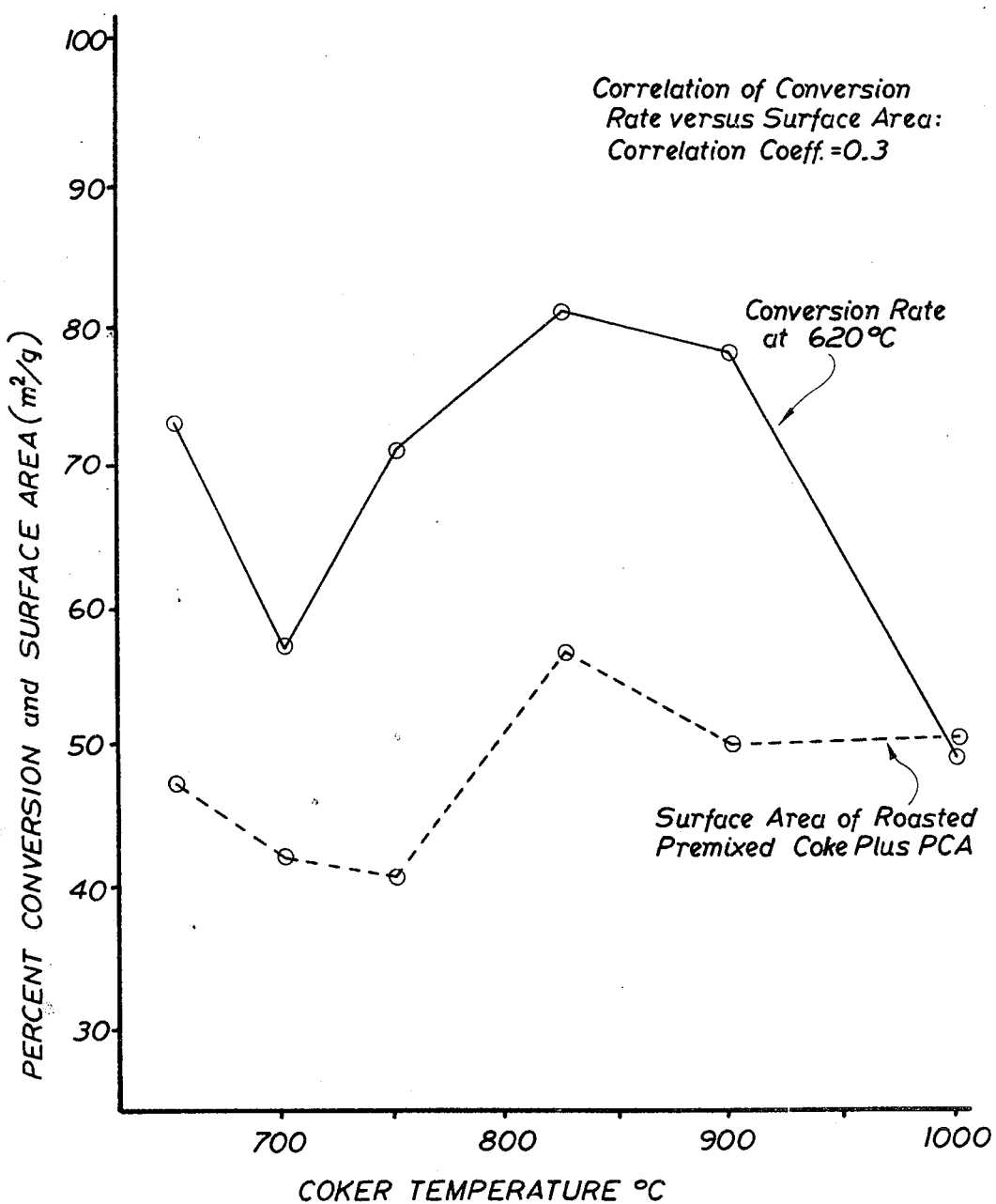
FIG. 5 is a graph correlating surface area with conversion rate.

It should also be noted that it is desirable that the surface area of the calcined alumina-petroleum coke mixture be at least 40 m$^2$/g, with 70 to 120 m$^2$/g being the preferred range. FIG. 5 illustrates graphically the correlation between the surface area of the calcined mixture of alumina and petroleum coke and the aluminum chloride conversion rate.

With respect to the mixture of alumina and petroleum coke, it should contain from 70 to 90 wt.% alumina and 10 to 30 wt.% petroleum coke with a preferred amount of petroleum coke being in the range of 15 to 25 wt.%.

The following examples are further illustrative of the invention.

EXAMPLES 1-19

Examples 1-19 were started with mixtures of green petroleum coke and partially calcined alumina (PCA). The green petroleum coke referred to is of the following elemental analysis:

|  | 650° C. | 750° C. | 825° C. |
| --- | --- | --- | --- |
| C | 90.8% | 91.0% | 92.1% |
| H | 2.49% | 2.14% | 1.74% |
| S | 1.81% | 1.79% | 1.76% |
| N | 1.18% | 1.17% | 1.30% |
| Surface Area (m$^2$/g) | 1.0 | 1.5 | 2.0 |

The alumina had the following characteristics:

| Moisture | 1.30 wt. % |
| --- | --- |
| Loss on Ignition (LOI) | 1.29 |
| Surface area (B.E.T.) | 92 m$^2$/g |

Figure 3:
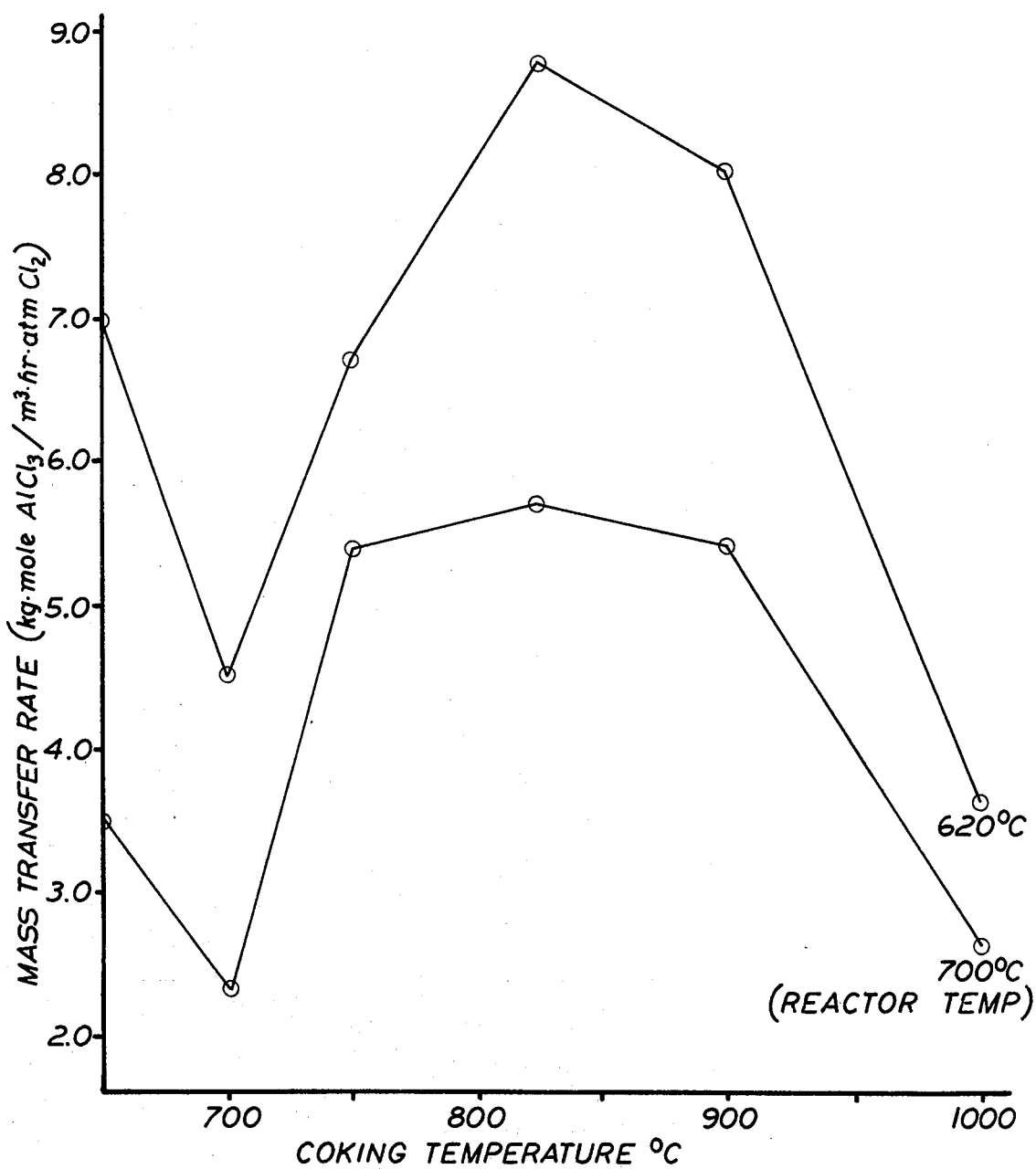
FIG. 3 is a graph showing the effect of coking temperature upon mass transfer rate.

In each of these examples, the mixture of coke and alumina was calcined for approximately 30 minutes before being chlorinated in the reactor shown in FIG. 2. The reactor had a starting bed of 1600 g of roasted material (0.25 meter bed). Solids were fed into the reactor at a rate of 4 g/min. The chlorine feed rate was 2.00 kmol/m$^2$hr (with the exception of Example 10). Reactor temperatures were varied from 575° to 750° C. The results for each example are presented in terms of chlorine conversion and mass transfer rate in Table 1. FIG. 3 illustrates these same results graphically.

Chlorine conversion ($Y_f$) was calculated from a gas chromatograph analysis of the desublimer offgas using the following equation:

$$Y_f = \frac{2(\% CO_2) + (\% CO) + (\% COCl_2)}{2(\% CO) + (\% CO) + 2(\% COCl_2) + (\% Cl_2) + 0.5(\% HCl)}$$

It can be seen from these examples that chlorination of a mixture of alumina and green petroleum coke which has been calcined at a temperature between 650° and 900° C. for 10 to 120 minutes is a practical alternative to prior art methods of chlorination of alumina.

Comparison of Examples 9 and 11 and of 13 and 16 indicates a clear correlation between the amount of petroleum coke present in the reactant mixture (in the reactive range) and the extent of chlorination. Comparison of Example 10 with Example 11 suggests that the rate of chlorine flow in the reactor does affect the chlorination mass transfer rate, but this effect is not nearly so significant as that attributed to the percentage of petroleum coke present in the mixture. Examples 18 and 19 indicate that calcination at 1000° C. deactivates the petroleum coke and hinders the chlorination reaction.

TABLE 1

| Example | Material | Coker Temp. | %C/%PCA | Reactor Run | Reactor Temp. | Cl$_2$ Flow | %CO$_2$ | %CO | %Cl$_2$ | %COCl$_2$ | %HCl | Conv | K |
|---|---|---|---|---|---|---|---|---|---|---|---|---|---|
| 1 | Pet Coke-PCA | 650° C. | 20/80 | 18 | 650° | 2.00 | 5.9 | 0.6 | 6.0 | 0.1 | 3.3 | 61.0 | 5.0 |
| 2 | " | 650° C. | " | 10 | 700° | " | 5.0 | 0.5 | 10.1 | 0.1 | 2.1 | 48.1 | 3.5 |
| 3 | " | 700° C. | " | 14 | 620° | " | 5.4 | 0.5 | 5.8 | 0.2 | 5.1 | 56.9 | 4.5 |
| 4 | " | 700° C. | " | 15 | 700° | " | 3.5 | 0.1 | 12.2 | 0.1 | 4.5 | 35.4 | 2.3 |
| 5 | " | 750° C. | " | 13 | 575° | " | 5.4 | 0.6 | 3.3 | 0.2 | 3.6 | 67.8 | 6.1 |
| 6 | " | 750° C. | " | 11 | 620° | " | 6.3 | 0.7 | 3.2 | 0.2 | 3.4 | 71.3 | 6.7 |
| 7 | " | 750° C. | " | 12 | 700° | " | 6.1 | 0.8 | 5.0 | 0.1 | 3.4 | 63.5 | 5.4 |
| 8 | " | 825° C. | " | 23 | 620° | " | 8.6 | 0.4 | 3.1 | 0.2 | 1.9 | 80.9 | 8.8 |
| 9 | " | 825° C. | 10/90 | 32 | 620° | " | 4.0 | 0.1 | 8.9 | 0.1 | 4.5 | 41.0 | 2.8 |
| 10 | " | 825° C. | 20/80 | 47 | 620° | 3.02 | 9.4 | 0.6 | 6.6 | 0.4 | 5.9 | 65.8 | 8.7 |
| 11 | " | 825° C. | " | 42 | 620° | 2.00 | 5.6 | 0.5 | 1.5 | 0.2 | 3.5 | 77.3 | 7.9 |
| 12 | " | 825° C. | " | 26 | 700° | " | 6.3 | 0.7 | 4.0 | 0.1 | 6.0 | 65.4 | 5.7 |
| 13 | " | 900° C. | " | 17 | 620° | " | 7.3 | 0.8 | 2.7 | 0.2 | 2.6 | 77.6 | 8.0 |
| 14 | " | 900° C. | " | 16 | 700° | " | 5.5 | 0.9 | 5.1 | 0.1 | 3.2 | 63.7 | 5.4 |
| 15 | " | 900° C. | " | 20 | 750° | " | 4.5 | 0.1 | 9.9 | 0.1 | 0.7 | 46.6 | 3.4 |
| 16 | " | 900° C. | 28/72 | 53 | 620° | " | 8.1 | 1.3 | 0.8 | 0.2 | 1.8 | 89.5 | 12.0 |
| 17 | " | 900° C. | " | 55 | 620° | " | 3.0 | 0.4 | 0.3 | 0.1 | 3.0 | 77.2 | 7.9 |
| 18 | " | 1000° C. | 20/80 | 21 | 620° | " | 4.8 | 0.1 | 10.1 | 0.1 | 0.0 | 48.8 | 3.6 |
| 19 | " | 1000° C. | " | 22 | 700° | " | 3.8 | 0.3 | 13.0 | 0.1 | 0.0 | 38.9 | 2.6 |

The reported value is an average of all samples (taken at regular time intervals) that were recorded during the reactor run.

EXAMPLES 20-24

These examples (shown in Table 2) were run using the same materials used in Examples 1-19. In these examples, however, the green petroleum coke was calcined before being mixed with alumina.

TABLE 2

| Example | Material | Coker Temp. | %C/%PCA | Reactor Run | Reactor Temp. | Cl$_2$ Flow | %CO$_2$ | %CO | %Cl$_2$ | %COCl$_2$ | %HCl | Conv | K |
|---|---|---|---|---|---|---|---|---|---|---|---|---|---|
| 20 | Pet Coke-PCA | 825° C. | 20/80 | 29 | 620° | 2.00 | 6.6 | 0.2 | 4.5 | 0.2 | 6.6 | 68.3 | 6.1 |
| 21 | " | 825° C. | " | 85 | 620° | 2.24 | 5.6 | 0.2 | 4.9 | 0.2 | 3.2 | 63.9 | 6.1 |
| 22 | " | 825° C. | " | 87 | 620° | 1.12 | 3.4 | 0.2 | 0.6 | 0.1 | 0.9 | 85.7 | 5.8 |
| 23 | " | 825° C. | " | 65 | 620° | 2.00 | 7.3 | 0.2 | 8.2 | 0.1 | 0.0 | 64.3 | 5.6 |
| 24 | " | 825° C. | " | 66 | 620° | " | 8.7 | 0.5 | 2.9 | 0.2 | 1.5 | 78.2 | 6.7 |

Mass transfer (K), given in units of kmol AlCl$_3$/m$^3$h-r.atm.Cl$_2$ was determined by the following equations:

$Q = (Cl_2 \text{ feed rate})(Y_f)/\text{Bed Depth}$

Partial pressure of $$Cl_2 = P\left(Y_f/\ln\frac{1}{(1-Y_f)}\right),$$

where P = reactor pressure.

K = Q/1.5(Partial Pressure of Cl$_2$)

While the foregoing description of our invention has been made with reference to preferred embodiments of our process, numerous changes and modifications may be made therein without departing from the spirit and scope of the invention defined by the following claims.

What is claimed is:

1. A process for the chlorination of aluminous material which comprises reacting aluminous material with chlorine at a temperature of from 575° to 750° C. in the presence of a solid reducing agent obtained by calcining green petroleum coke at a temperature from 650° to 900° C. for a period of from 10 to 120 minutes.

2. The process of claim 1 wherein the aluminous material is alumina.

3. The process of claim 1 wherein the petroleum coke has been calcined at 825° C.

4. The process of claim 3 wherein the chlorination is carried out at 620° C.

5. The process of claim 1 wherein the chlorination is carried out in a fluidized bed.

6. The process of claim 1 wherein the chlorination reaction is carried out in the presence of a catalyst comprising an alkali metal and a halide.

7. The process of claim 1 wherein the aluminous material and green petroleum coke are mixed prior to calcination.

8. The process of claim 7 wherein the green petroleum coke has been calcined at 825° C.

9. The process of claim 7 wherein the chlorination is carried out at 620° C.

10. The process of claim 7 wherein the aluminous material is alumina.

11. The process of claim 7 wherein the chlorination is carried out in the presence of a catalyst comprising an alkali metal and a halide.

* * * * *